United States Patent [19]
Miller et al.

[11] 3,723,932
[45] Mar. 27, 1973

[54] THERMAL PROTECTIVE ASSEMBLY

[75] Inventors: Homer R. Miller, Rochester; Giacinto Vallone, Brockport, both of N.Y.

[73] Assignee: General Electric Company, Bridgeport, Conn.

[22] Filed: Feb. 1, 1971

[21] Appl. No.: 111,459

[52] U.S. Cl. ............................. 337/405, 337/295
[51] Int. Cl. ............................................. H01h 37/32
[58] Field of Search ...... 219/517; 337/401, 405, 414, 337/415, 416, 1, 4, 24, 290, 292, 295, 296; 340/250; 318/471, 472, 473; 322/33, 34

[56] References Cited

UNITED STATES PATENTS

| | | | |
|---|---|---|---|
| 3,201,646 | 8/1965 | Mansfield, Jr. | 337/24 X |
| 3,168,632 | 2/1965 | Baran et al. | 337/296 X |

Primary Examiner—Harold Broome
Attorney—Lawrence R. Kempton, Leonard J. Platt, John F. Cullen, Frank L. Neuhauser, Oscar B. Waddell and Joseph B. Forman

[57] ABSTRACT

A thermal protective assembly for an electrical component such as a motor has a field winding which uses a heat meltable alloy formed into a bent shape and connected in series with and resting on the field. The alloy receives conductive heat from the windings and is designed to melt before the $I^2R$ heating from a malfunction breaks the circuit. The bent form of the alloy is chosen to create an open circuit and ensure no puddling to bridge the opening on melting of the alloy. Additional means is provided to insulate the alloy from the field windings and to cover it from the ambient whereby it responds only to conductive heat.

5 Claims, 3 Drawing Figures

Patented March 27, 1973 3,723,932

Inventors:
Homer R. Miller,
Giacinto Vallone
by
Attorney 3,723,932

THERMAL PROTECTIVE ASSEMBLY

BACKGROUND OF THE INVENTION

1. Field of the Invention

The invention herein pertains to a thermal protective arrangement for a motor and, more particularly, to a thermal fuse assembly that is designed to react only to conductive heat and is formed to ensure an open circuit upon melting of the fuse alloy.

2. Description of the Prior Art

Various thermal protective arrangements have been proposed for motors and other electrical and nonelectrical applications. Generally, these have involved the use of a heat-meltable alloy with some spring means to ensure a clean separation and break in the circuit upon melting or have relied on the $I^2R$ heating to break the circuit. The difficulty with the first of such devices is that the spring-effect requires additional structure such as a spring or a holder or both thus adding to the cost. If the current in an electrical circuit is relied upon for the generated heat to break the circuit, the field windings or motor may be severly damaged before the circuit is broken.

SUMMARY OF THE INVENTION

Briefly described, the present invention is directed to a thermal protective arrangement for a motor or like device having a field winding and which uses a heat-meltable alloy formed into an unsupported bent shape, such as a U, and connected in series with the field. The alloy is disposed to freely rest on the field without additional structure to receive conductive heat from the windings. It is also connected in series with the field and, by its placement, is heat sensitive from conduction rather than current sensitive whereby it melts to open the circuit upon its selected field temperature. Suitable insulation is used between the alloy and field winding to separate the two and is used over the alloy to protect it from ambient conditions and expose it to pure conduction. The particular bent or U-shape ensures that the circuit is broken and is not bridged by any puddling of the melted alloy. This shaped construction of the unsupported alloy freely resting on the field obviates the need for any fuse holders or extra components to provide a spring action for breaking of the circuit. Thus, the main object of the invention is to provide an improved thermal protective arrangement with a particularly shaped heat meltable alloy in series with the component it is protecting and which senses conductive heat rather than current generated heat to provide an inexpensive and reliable protective assembly.

DESCRIPTION OF THE PREFERRED EMBODIMENT

Figure 1:
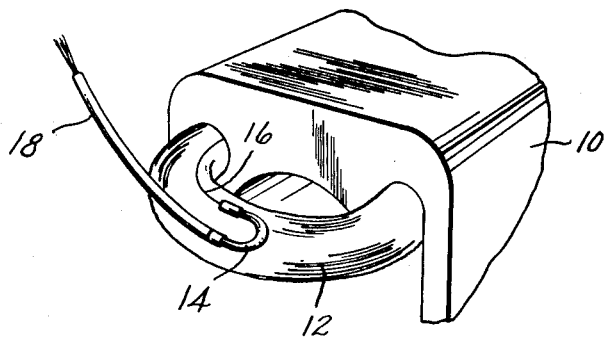
FIG. 1 is a partial perspective view illustrating the protective assembly as applied to a stator winding and showing the U-shape of the alloy.

Referring first to FIG. 1, there is shown part of a stator 10 employing a field winding 12 as may be used in a motor or any other current-conducting electrical component such as a generator or transformer and the term motor is used in the broad sense for convenience to cover such obvious equivalents. Normally, the field winding 12 has ends to connect it into an electric circuit to provide field current as is well known.

In many applications a fuse-protected field may be employed in a heat sensitive environment and may use compounds such as polyesters on the wiring of the winding. When heat is generated by the environment or by shorts, the compounds may fume and burn or the usual varnish may burn on the rotor or even gases may be created and burn. As a result, the motor generally burns and is severly damaged before the device is rendered electrically inoperative generally by the standard fuse blowing when the $I^2R$ is sufficiently high to melt the fuse.

It is desired to protect the motor by breaking the circuit early so that the motor is not irreparably damaged or, even if irreparably damaged, by burned insulation for example, to control the damage and break the circuit before disastrous action, such as a fire, can occur. To this end, a fuse or thermal protective assembly 14 is connected in series with the motor winding between leads 16 and 18. As so far described, the protective assembly is nothing more than an ordinary fuse in series with the line as is well known.

In order to protect the field assembly, a fuse alloy 14 is formed into a bent shape such as the U shown and is disposed to freely rest upon the field winding unsupported or stressed by any other components as shown in FIG. 1. In other words, the alloy 14 is bent and pressed said against field windings 12 to freely rest unsupported thereon to provide good heat conduction therebetween. In order to prevent a direct short, a suitable insulating means 20, which may be in the form of a paper tape, is disposed between the alloy and the field as partly shown in FIG. 2 to electrically insulate between the two but not to prevent heat conduction therebetween. The significance of the non-straight or bent form of the alloy is to prevent any puddling upon melting thereof and consequent bridging of the gap to complete the circuit. This can occur by the melted alloy forming a bead along the wire which would then hold together until the current flow develops enough $I^2R$ heat to burn out the motor winding. A convenient bend in the form of a U or any similar non-straight form is sufficient to ensure a clean break in the freely resting and unsupported form as shown. By providing the bent shape in the unsupported form, no other parts such as holders or springs are required and the melted alloy operates somewhat like the well-known liquid mercury in that, when melted, it separates and no glob or puddling forms. This ensures a complete break and thus shutting down of the electrical circuit to protect the motor.

Figure 3:
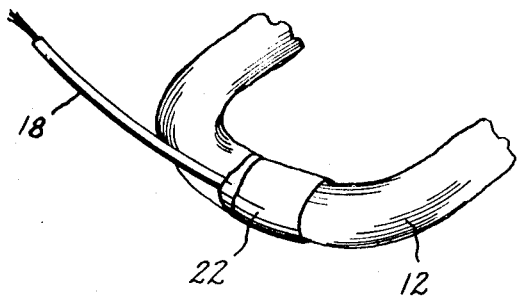
FIG. 3 is a similar view showing the overlying insulation and completed assembly.

In order that the alloy be subject only to the heat of conduction, it is shielded from ambient air currents by an additional insulating means 22 covering the fuse assembly as shown in FIG. 3. The fuse assembly then becomes completely heat sensitive by conduction and is not sensitive to heat by convection from a fan or other extraneous air flows around the assembly. The alloy may be any suitable alloy which is selected with respect to a tolerable field temperature so that it is heat sensitive rather than current sensitive to melt by direct conduction of heat from the field before the I²R heating from a circuit malfunction would cause the fuse to melt. In other words, the alloy is below the I²R melting temperature. Consequently, if the device is placed in a motor, the motor may be started in a stalled condition and run for a period of time before the device would melt and break the circuit.

Any suitable bent form of the freely resting fuse may suffice and the U-shape has been shown simply because it operates satisfactorily.

Figure 2:
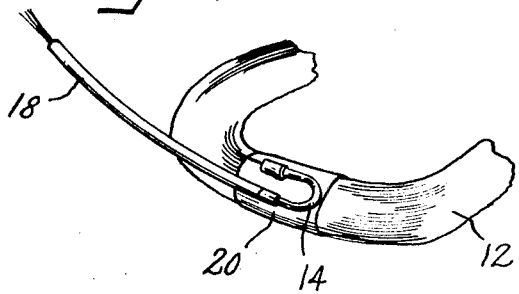
FIG. 2 is a partial view showing how insulation is used between the alloy and field.

The simple thermal-protective assembly shown is designed to protect electric components such as in a motor by sensing heat and reacting before the device is damaged, or to control the damage rather than merely break the circuit. By shaping and freely resting and placing the device as shown, the overheating of the field immediately blows the fuse before any damage is done and leaves the motor repairable. It further breaks the circuit well before the customary I²R or current-sensitive fuse would operate. Such a device is useful in the low-cost and non-metallic compounds that may fume and burn well before the circuit is broken. Further, the device is a simple, low-cost device that requires no extraneous parts such as holders or spring structure because of its bent shape and free resting position as shown in FIG. 2.

While there has been shown a preferred form of the invention, obvious equivalent variations are possible in light of the above teachings. It is therefore to be understood that within the scope of the appended claims the invention may be practised otherwise than as specifically described, and the claims are intended to cover such equivalent variations.

We claim:

1. A thermal protective arrangement for a motor having a field winding comprising,
    a heat meltable alloy formed into an unsupported bent shape and connected in series with the field and freely resting thereon to receive conductive heat from said windings,
    said alloy being heat sensitive rather than current sensitive
    whereby it melts to open the circuit upon a selected field temperature and the unsupported bent shape ensures an open circuit.

2. Apparatus as described in claim 1 having,
    means disposed between said alloy and field to electrically insulate therebetween, and
    means covering said alloy to shield it from ambient.

3. Apparatus as described in claim 1 wherein said alloy is bent in a U-shape to ensure said open circuit upon melting of said alloy.

4. Apparatus as described in claim 3 having means disposed between said alloy and field to electrically insulate therebetween, and
    means covering said alloy to shield it from ambient.

5. Apparatus as described in claim 4 wherein said alloy is selected to melt by direct conduction of heat from said field before the I²R heating from a malfunction breaks the circuit.

* * * * *